United States Patent [19]

Nonoyama et al.

[11] Patent Number: 5,534,357
[45] Date of Patent: Jul. 9, 1996

[54] BRAZING SHEET FOR VACUUM BRAZING

[75] Inventors: Tatsuhiko Nonoyama, Chiryu; Shoei Teshima, Kariya; Haruhiko Otsuka, Okazaki; Yasuyuki Tanaka, Gamagori; Kouji Hiragami, Okazaki, all of Japan

[73] Assignee: Nippondenso Co., Ltd., Kariya, Japan

[21] Appl. No.: 399,145

[22] Filed: Mar. 6, 1995

Related U.S. Application Data

[62] Division of Ser. No. 76,186, Jun. 14, 1993, abandoned, which is a division of Ser. No. 860,759, Mar. 31, 1992, Pat. No. 5,257,731.

[30] Foreign Application Priority Data

Apr. 4, 1991 [JP] Japan .................. 3-071851

[51] Int. Cl.$^6$ .................................................. B32B 15/20
[52] U.S. Cl. .................................................. 428/629; 428/654
[58] Field of Search ............................ 428/650, 651, 428/652, 653, 654, 607, 629; 228/262.51, 206

[56] References Cited

U.S. PATENT DOCUMENTS

| | | | |
|---|---|---|---|
| 3,321,828 | 5/1967 | Miller | 29/488 |
| 3,373,483 | 3/1968 | Miller | 228/217 |
| 3,782,929 | 1/1974 | Werner | 228/262.51 |
| 3,788,824 | 1/1974 | Singleton et al. | 228/262.51 |
| 3,843,333 | 10/1974 | Woods | 29/191 |
| 3,852,873 | 12/1974 | Charlet | 228/207 |
| 3,898,053 | 8/1975 | Singleton | 428/654 |
| 4,119,262 | 10/1978 | Yen et al. | 228/212 |
| 4,140,262 | 1/1979 | Wagner | 228/8 |
| 4,143,802 | 3/1979 | Winterbottom | 228/217 |
| 4,146,163 | 3/1979 | Anderson et al. | 228/262.51 |
| 4,161,553 | 7/1979 | Vernam et al. | 428/654 |
| 4,214,925 | 7/1980 | Arita et al. | 228/262.51 |
| 4,221,561 | 9/1980 | Limque et al. | 432/128 |
| 4,240,574 | 12/1980 | Schmatz et al. | 228/217 |
| 4,988,036 | 1/1991 | Kemble et al. | 228/262.51 |
| 5,016,809 | 5/1991 | Winterbottom et al. | 228/262.51 |
| 5,096,110 | 3/1992 | Schmatz et al. | 228/102 |
| 5,104,459 | 4/1992 | Chen et al. | 148/552 |
| 5,141,703 | 8/1992 | Schmid et al. | 420/407 |
| 5,234,759 | 8/1993 | Inabayashi et al. | 428/654 |

FOREIGN PATENT DOCUMENTS

| | | |
|---|---|---|
| B29577 | 8/1990 | Australia . |
| B74411 | 10/1991 | Australia . |
| 004096 | 9/1979 | European Pat. Off. . |
| 272163 | 6/1988 | European Pat. Off. . |
| 63-52764 | 3/1988 | Japan . |
| 3-264188 | 11/1991 | Japan .................. 228/262.51 |
| 1465725 | 3/1977 | United Kingdom . |

*Primary Examiner*—John Zimmerman
*Attorney, Agent, or Firm*—Cushman, Darby & Cushman

[57] ABSTRACT

A brazing sheet for vacuum brazing is provided wherein the sheet is cladded with an aluminum alloy brazing filler metal having a content of Mg sufficient for vacuum brazing but less than 1.2 wt. % and wherein the $Mg_2Si$ particle size among Mg contained in the metal is not more than 5 μm as a typical value.

2 Claims, 10 Drawing Sheets

BRAZING SHEET FOR VACUUM BRAZING

This is a continuation of application No. 08/76,186, filed Jun. 14, 1993, now abandoned, which is a divisional of application Ser. No. 07/860,759, filed Mar. 31, 1992, now U.S. Pat. No. 5,257,781—Nov. 2, 1993.

BACKGROUND OF THE INVENTION

FIELD OF THE INVENTION

The present invention relates to an aluminum vacuum brazing method and furnace for brazing a workpiece, carried into a vacuum brazing furnace, with a brazing filler material of aluminum alloy containing Mg, as Well as an aluminum brazing sheet for vacuum brazing.

DESCRIPTION OF THE RELATED ART

Heretofore, based on the basic technique as disclosed in U.S. Pat. No. 3,321,828, there is known a method of vacuum brazing aluminum that uses a brazing sheet comprising a core member cladded with a brazing filler-metal containing Mg (magnesium) added thereto.

This addition of Mg to the brazing filler metal is made in expectation of (1) breakage of an oxide film on the brazing sheet surface, (2) removal of an oxidizing atmosphere ($H_2O$, $O_2$) within the furnace by use of the function of gettering, and (3) reducing function.

However, Mg, which is necessary for aluminum vacuum brazing, is adsorbed on furnace walls and on mechanical parts to cause mechanical troubles. In addition, the brazing quality is reduced by water ($H_2O$) adsorbed on Mg which is adsorbed on walls.

In view of the above, Japanese Patent Unexamined Publication No. 63-52764 proposes a following technique. A workpiece is carried into a heating chamber covered by heat shielding plates in the furnace. In order to prevent Mg vapor to scatter into the furnace, a gas flow port of the heating chamber is closed by a shielding member when the temperature in the furnace reaches some predetermined temperature at which Mg starts evaporation.

In a conventional aluminum vacuum-brazing method, the concentration of Mg in the brazing filler metal cladded over a brazing sheet was usually in a range of 1.2 wt. % to 2 wt. %. In view of decreasing the Mg adsorption on furnace walls and resource saving, it is desired to decrease the Mg concentration in the brazing filler metal.

Decreasing the Mg concentration, however, weakens he Mg function pointed-out above and may result in (1) breakage of an oxide film, (2) gettering, and (3) reducing function.

It is apparent from the above-cited Japanese Pat. Laid-Open No. 63-52764 that densification of Mg vapor in the furnace can be expected and that the concentration of Mg in the brazing filler metal may be lowered. The above proposed technique, however, does not lessen the Mg content, as explained below.

Because the above proposed technique is specifically aimed to solve the Mg contamination problem of the furnace caused by evaporation and absorption of Mg, the gas flow port of the heating chamber is closed at about the furnace- (or the workpiece-)temperature that Mg starts evaporating. Accordingly, even though densification of Mg vapor in the heating chamber might be expected, the large amount of remaining water vapor in the heating chamber, unless evacuated sufficiently, disposes the brazing quality.

In other words, although densification of Mg vapor in the heating chamber has been achieved in the past, no measures have been considered in point how to decrease the Mg content.

SUMMARY OF THE INVENTION

A first object of the present invention is to provide a method of aluminum vacuum brazing which can exhibit such functions as breakage of an oxide film, gettering and reducing, even with the lowered amount of Mg added to a brazing filler metal.

A second object of the present invention is to provide a furnace for aluminum vacuum brazing which is suitable for practicing the present aluminum vacuum brazing method and can perform vacuum brazing efficiently.

A third object of the present invention is to provide a brazing sheet in which a brazing filler metal of aluminum alloy for vacuum brazing is cladded over the surface of a core member, and which is optimum for use in the present novel method of aluminum vacuum brazing.

To achieve the above first object, the present invention provides a method of aluminum vacuum brazing of workpieces by brazing filler metal of a predetermined concentration of Mg. Here the workpieces are usually made of the brazing sheet with its surfaces covered (cladded) with brazing filler metal. The gas flow in a predetermined area covering the workpiece in a vacuum brazing furnace is limited after the pressure is lowered and reaches a predetermined high vacuum level, but prior to the temperature in the furnace exceeding a predetermined value in the vicinity of the solidus line of the brazing filler metal of aluminum alloy containing Mg. Herein, the predetermined level of high vacuum is determined from the relationship between the furnace pressure, and especially the amount of water vapor in the furnace. Here the term, a high vacuum level, generally implies the pressure below $1 \times 10^{-4}$ Torr (or $1.33 \times 10^{-2}$ Pa).

Before explaining operation of the present invention behavior of brazing filler metal in the process of aluminum vacuum brazing will be first explained.

Magnesium contained in such a brazing filler metal of aluminum alloy has a property to vaporize under vacuum heating at a temperature above about 500° C. and a pressure below about 0.78 Torr. This vaporization is enhanced at temperatures in the vicinity of the solidus line of the brazing filler metal.

Figure 1:
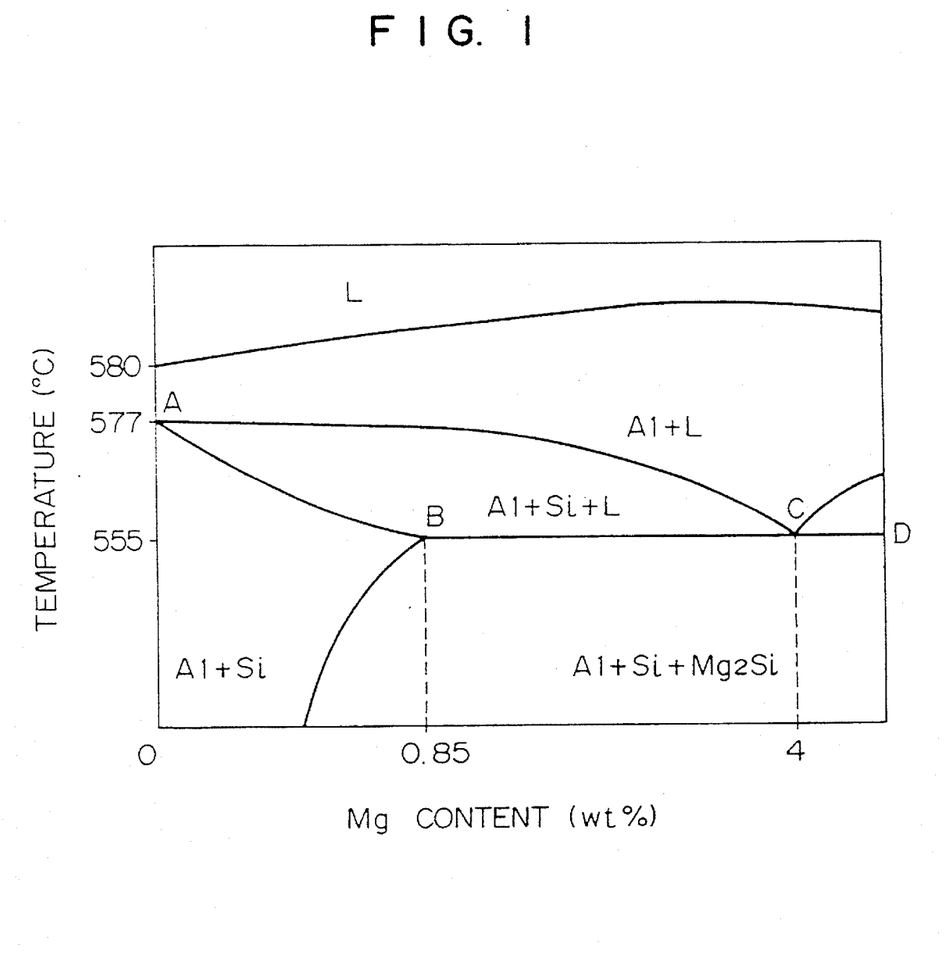
FIG. 1 is a phase diagram of an Al-10% Si alloy.

The temperature of the solidus line depends on the alloying contents and their concentrations. By way of example, FIG. 1 shows a state diagram of a typical brazing filler metal of aluminum alloy (Al-10 wt. % Si) containing Mg. In FIG. 1, a curved line connecting two points A and B and a straight line connecting three points B, C, and D represent the solidus line. The solidus line temperature decreases from 577° C. down to 555° C. as the Mg concentration is increased from 0 wt. % to 0.85 wt. %. The temperature is constant and 555° C. for the Mg concentration not less than 0.85 wt. %.

Let now consider the temperature dependence of Mg evaporation from a brazing filler metal in the vacuum brazing furnace, referring to a typical vacuum brazing filler metal. Al-10 wt. % Si—1.2 wt. % Mg as an example. In this case, Mg begins to evaporate when the furnace (as well as the workpiece) temperature reaches about 500° C. The Mg evaporation is enhanced when the temperature reaches 555° C. (the temperature of the solidus line), and comes to a peak in a temperature range from about 560° C. to 570° C. For a higher temperature range, Mg evaporation decreases because of exhaustion of Mg source in the filler metal.

On the other hand, gettering by Mg is expressed by the following reactions:

$$Mg + H_2O \rightarrow MgO + H_2 \qquad (1)$$

$$Mg + \tfrac{1}{2}O_2 \rightarrow MgO \qquad (2)$$

In the vacuum brazing, the $H_2O$ gettering reaction (1) is especially important because the main ingredient in vacuum is $H_2O$ vapor above $10^{-9}$ Torr, and is the dislodged portion of the adsorbed water onto the vacuum brazing furnace wall.

The function of $H_2O$ gettering can be divided into two categories: "atmosphere gettering" that remove $H_2O$ from the vacuum brazing atmosphere, and "re-oxidization preventive gettering" that prevents a molten brazing filler metal from being re-oxidized and thus losing its fluidity at temperature not lower than the solidus line temperature.

Accordingly, (1) $H_2O$ content in a brazing atmosphere is required to be sufficiently small, thereby the required amount of Mg for atmosphere gettering is small. On the other hand, (2) Mg vapor-density enhancement in the atmosphere near the workpiece is required, thereby the re-oxidization preventive gettering develops sufficiently.

The first condition that a flow of gas is limited soon after the vacuum brazing furnace pressure reaches a predetermined high vacuum, of the present invention, is condition for the efficient atmosphere gettering by sufficiently decreasing the amount of $H_2O$ in the atmosphere. The second condition that a flow of gas is limited prior to the temperature in the furnace exceeding a predetermined value in the vicinity of the solidus line of the brazing filler metal of aluminum alloy containing Mg, is a condition for the efficient re-oxidization preventive gettering by plentifully evaporating Mg in the brazing filler metal into the atmosphere.

With the invention, by limiting a flow of gas in a predetermined area surrounding the workpiece in the furnace when both of the above two conditions are met, the satisfactory re-oxidization preventive gettering can be realized at temperatures not lower than the temperature of the solidus line.

If a flow of gas in the furnace is limited based on only the second condition relating to the furnace temperature, the re-oxidization preventive gettering would be insufficient because $H_2O$ amount in the atmosphere within the predetermined area surrounding the workpiece is not so sufficiently lowered that, even though the Mg amount in the atmosphere is densified, a larger amount of Mg is required to be supplied for the atmosphere gettering, or the atmosphere gettering itself might be insufficient in some cases.

On the other hand, if a gas flow is limited in the state meeting only the first condition, but not the second condition, i.e., after the furnace temperature exceeding the solidus line temperature to a substantial extent, Mg densification would be insufficient in the predetermined area surrounding the workpiece so that the satisfactory re-oxidization preventive gettering could not be achieved.

Thus, if any of the two conditions relating to pressure and temperature is not met, satisfactory development of the re-oxidization preventive gettering would be disabled unless the atmosphere contains a large amount of Mg, such as the case that Mg of 2 wt. % or more must be contained in the brazing filler metal cladded over the brazing sheet.

However, with the invention, since $H_2O$ can be sufficiently lean and Mg can be sufficiently rich in the atmosphere within the predetermined area surrounding the workpiece, a minimum amount of Mg necessary for the re-oxidization preventive gettering is required for the brazing filler metal. As a result, vacuum brazing can be practiced with using the brazing filler metal of the Mg content less than 1.2 wt. %.

When practically industrializing the present invention, the predetermined value in the condition is set to a temperature preferably located in the vicinity of the solidus line temperature. Also, a heating pattern is required to be determined that the furnace temperature will not exceed the solidus line temperature to a substantial extent before the furnace pressure reaches a predetermined high vacuum defined in the first condition. Further, as an evacuation condition prior to limiting a flow of as, it is advantageous to increase the furnace evacuation conductance.

Meanwhile, an oxide film is formed on the surface of a brazing filler metal. In vacuum brazing, fine crystals (grains) of MgO or $Al_2O_3$ grow just under the oxide film to develop microcracks in the film. The MgO crystals growth is achieved by $O_2$ and Mg diffusion.

When, by heating, the temperature of the brazing filler material reaches the solidus line, the liquid phase appears at grain boundaries of the brazing filler metal. When the liquid phase reaches the surface of the brazing filler metal, the microcracks previously developed are enlarged into cracks as a result of the difference in thermal expansion coefficient between the liquid phase and the solid phase and volume expansion due to Mg vaporization.

On the other hand, Mg contained in the brazing filler metal diffuses through both the solid phase and the liquid phase to reach the surface of the brazing filler metal where it is impinged with $H_2O$ molecules residing in the brazing atmosphere to cause the atmosphere gettering through the reaction (1). This atmosphere gettering is intensified when cracks occur in the surface of the brazing filler metal and is much more intensified when the liquid phase begins to appear at the brazing filler metal surface.

Accordingly, for the efficient atmosphere gettering, a lower temperature breakage of the oxide film on the surface of the brazing filler metal is desirable.

Besides the feature described above the method of aluminum vacuum brazing of the present invention is featured such that, prior to carrying the workpiece into the vacuum brazing furnace, a particle size-fining process is implemented by heat treatment to fine the particle size of $Mg_2Si$ in the brazing filler metal of aluminum alloy containing Mg.

In the particle-size fining process, it is preferable to adopt a technique capable of increasing nucleation of $Mg_2Si$ particles and suppressing the growth of precipitates, thereby making the particle size of $Mg_2Si$ smaller. Practically, it is only required in a homogenizing (soaking) process, which is implemented for the purpose of homogeneizing a conventional brazing filler metal process, to perform the heat treatment at the lowered soaking temperature for a shorter period of time.

With a temperature elevation in the brazing process, $Mg_2Si$ particles gradually decomposed, while reacting with surrounding Al, from their surfaces through the following reaction formula:

$$Al + Si + Mg_2Si \rightarrow Al + Si + L(\text{liquid phase}). \qquad (3)$$

With the invention, the particle size of $Mg_2Si$ is made small in the particle size-fining process so as to enlarge the total surface area of all the $Mg_2Si$ particles. The enlarged total surface area eventually implies an increase in speed of the reaction (3), i.e., in decomposition rate of $Mg_2Si$.

Thus, with the invention, by making the particle size of Mg$_2$Si smaller, a large amount of Mg can diffuse at a lower temperature. This enables the oxide film to break at a lower temperature and the atmosphere gettering to start at a lower temperature.

Additionally, the particle size-fining process is particularly arranged to provide the particle size of Mg$_2$Si preferably 5 μm or less as a typical value, more preferably 2 μm or less as a typical value.

Moreover, not only the breaking the oxide film at a lower temperature but also speeding up the progress of breakage, and of course both of them are effective for satisfactory vacuum brazing with the smaller Mg content.

From such viewpoint, besides the above features, the method of aluminum vacuum brazing of the present invention is featured in that, prior to carrying the workpiece into the vacuum brazing furnace, an oxide film-thinning process is implemented by etching treatment to thin an oxide film on the surface of the brazing filler metal of aluminum alloy containing Mg.

As mentioned before, the oxide film on the surface of a brazing filler metal begins to break by the process that fine crystals of MgO or Al$_2$O$_3$ grow just under the oxide film to push the oxide film outwardly and then to produce microcracks in the film. The thinner oxide film can be broken with more ease. The most effective method for that purpose is an etching treatment using a weak alkaline solution such as a diluted solution of NaOH.

The etching treatment may be implemented during a degreasing process performed immediately before the final annealing process in producing brazing sheets, by properly selecting compositions of the degreasing liquid. Alternatively, it is also of course possible to implement the etching treatment separately from such a degreasing process.

As an alternative, since the etching treatment is just required prior to the brazing process, the etching treatment may be performed during a degreasing process of each parts after pressing or other machining, by way of example, by properly selecting compositions of the degreasing liquid. Further, the etching treatment may be performed for assembly, rather than per part, during degreasing the assembled parts, or performed during an associated degreasing process or an independent process after completion of assembly of the parts.

The oxide film-thinning process is preferably selected to achieve such that the thickness of the oxide film becomes 100 angstroms (Å) or below.

It is also required that care must be paid on the following points in the etching treatment.

Excessive etching must be avoided to prevent Si particles precipitated in the brazing filler metal from being exposed on the surface of the brazing filler metal.

This is because the exposed Si particles on the surface of the brazing filler metal would increase Si density on the surface to raise the solidus line temperature and impair, as a result, the fluidity of the brazing filler metal.

Meanwhile, to achieve the second object, the inventors also accomplished a furnace for aluminum vacuum brazing, comprising a furnace body into which a workpiece to be brazed with a brazing filler metal of aluminum alloy containing Mg is carried, high-vacuum arrival detecting means for estimating or detecting that the pressure in the furnace body has reached a predetermined level of high vacuum, solidus-line temperature arrival detecting means for estimating or detecting that the workpiece temperature in the furnace body has reached in the vicinity of the solidus line temperature of the brazing filler metal of aluminum alloy containing Mg, and gas flow limiting means for limiting a flow of gas in a predetermined area surrounding the workpiece in the furnace body when the high-vacuum arrival detecting means estimates or detects that the pressure in the furnace body has reached a predetermined level of high vacuum, and also the solidus-line temperature arrival detecting means estimates or detects that the temperature in the furnace body has reached a predetermined value in the vicinity of the solidus line temperature of the brazing filler metal of aluminum alloy containing Mg.

Herein, the high-vacuum arrival detecting means may be arranged to detect arrival to a predetermined high vacuum level by measuring the pressure using a pressure sensor or sensors, or to estimate the arrival to a predetermined level of high vacuum by measuring a period of time from the start of the evacuation, for example, in consideration of the furnace volume, evacuation ability and so forth, or from experience.

The solidus-line temperature arrival detecting means may be arranged to detect arrival to the solidus line temperature by measuring the workpiece temperature using a temperature sensor or sensors, or to estimate the arrival to the solidus line temperature by measuring a period of time from the start of the heating, for example, in consideration of heat conductive characteristics and so forth, or by monitoring the atmosphere in the brazing furnace by a mass spectrometer or the like, thereby estimating the temperature of the workpiece from the monitored pattern.

Figure 2:
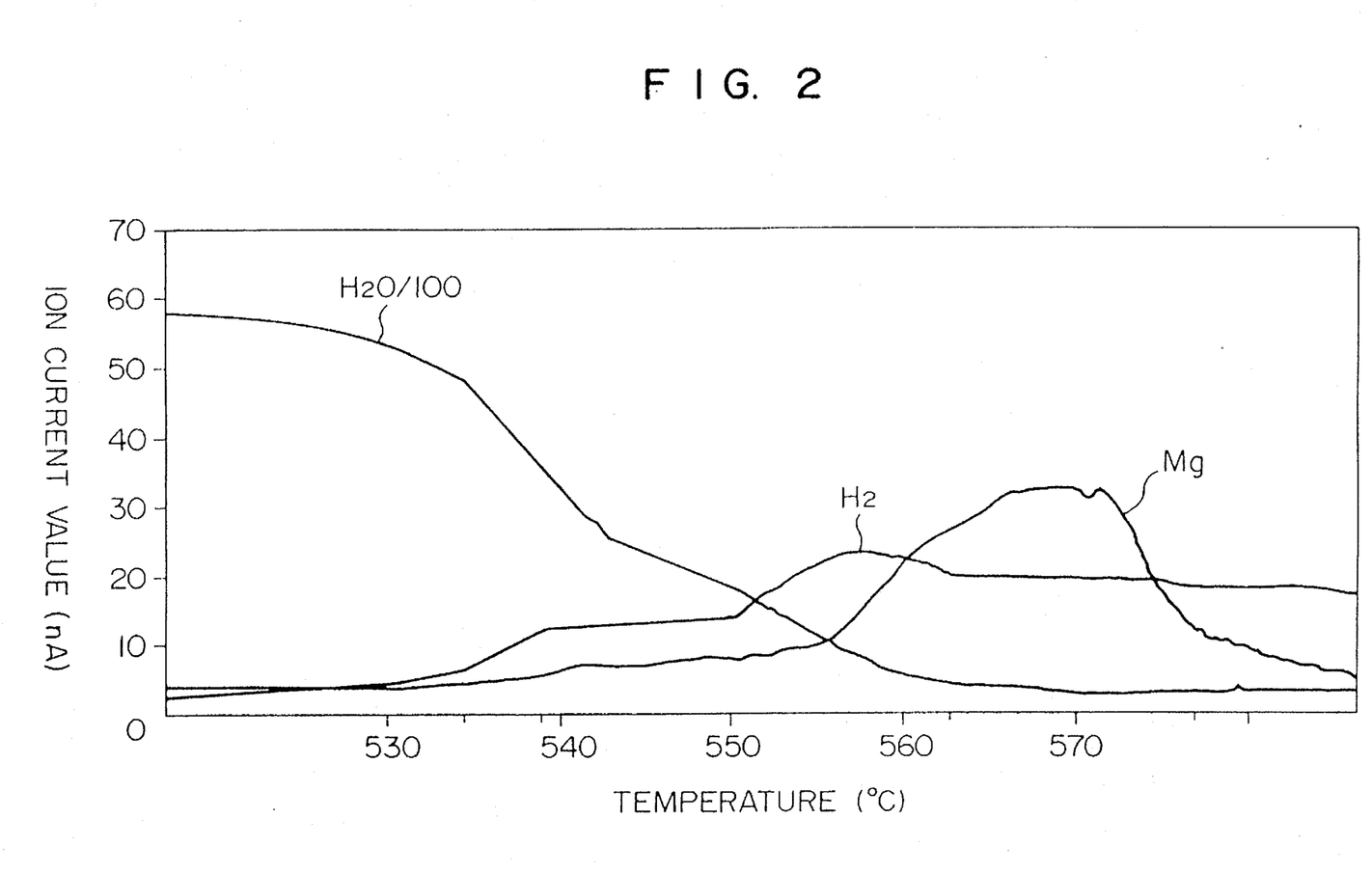
FIG. 2 is a graph illustrating changes in the amounts of $H_2O$ and Mg vapor in a vacuum brazing furnace during the temperature elevating stage in the brazing process, which is measured by using a mass spectrometer.

FIG. 2 shows an example of monitoring using a mass spectrometer. In this graph is plotted a mass analysis with respect to the axis of abscissa representing the brazing filler metal, the results being obtained by vacuum brazing a brazing sheet cladded with a brazing filler metal of an Al-10 wt. % Si alloy containing Mg of 0.8 wt. %, in,an experiment furnace. As shown, when the temperature of the brazing filler material reaches the solidus line, Mg starts vaporization to fill the furnace. On the other hand, the atmosphere gettering by the Mg vapor changes H$_2$O into H$_2$. Near at the solidus line temperature of the brazing filler metal, the amount of H$_2$O is the furnace is decreased, while the amount of H$_2$ therein is increased. As seen from this, the event that the furnace temperature reaches the solidus line temperature can be guessed or detected by monitoring the amount of H$_2$ through mass analysis.

The gas-flow limiting-means may be practiced by providing an opening and closing door, such as a shutter, or an evacuation control valve or the like between the brazing furnace and a vacuum pump, so that a flow of gas in a predetermined area surrounding the workpiece is limited by closing the shutter or the valve or the like.

With the invention, since the gas flow limiting means is operated under the state that the furnace pressure is at a high vacuum level and the furnace temperature reaches the solidus line temperature, the amount of H$_2$O becomes sufficiently lean and Mg is highly densified in the predetermined area surrounding the workpiece, so that Mg's specific functions such as atmosphere gettering, re-oxidation preventive gettering and breakage of an oxide film can be efficiently developed. Consequently, the amount of Mg to be contained in the brazing filler metal of aluminum alloy can be decreased.

In order to ensure that the gas-flow limiting-means is operated at the time when the solidus line temperature is reached after arrival to a high vacuum level, the timing to start evacuation and the timing to start heating should be of course adjusted so that the workpiece temperature will not reach the solidus line temperature before the furnace pressure reaches a high vacuum level.

For the purpose of speed-up of the evacuation and densification of Mg, the furnace conductance against evacuation is advantageously set large when the flow of gas is not limited by the gas-flow limiting-means, and small when the flow of gas is limited.

Further, in the present vacuum brazing furnace, it is desirable that the gas flow is not limited at any low-temperature regions not higher than 400° C. In other words, the furnace is desirably designed by considering the arrangement of heater, for example, such that the vaporized Mg gas will be confined in the brazing furnace entirely enclosed by furnace walls, shield plates and a door or doors all at raised temperatures. This prevents adsorption of Mg vapor onto low-temperature region in the furnace walls, etc., that would occur if such a low temperature region exists.

In addition, to achieve the third object, the inventors have accomplished a brazing sheet, that is cladded with a brazing filler metal of aluminum alloy for vacuum brazing in which metal the Mg content is less than 1.2 wt. % and the particle size of $Mg_2Si$ therein is selected to be 5 μm or less as a typical value, and a brazing sheet, that is cladded with a brazing filler metal of aluminum alloy for vacuum brazing in which metal the Mg content is less than 1.2 wt. % and the thickness of an oxide film on the metal surface is less than 100Å.

The $Mg_2Si$ particle size of brazing filler metal of aluminum alloy for vacuum brazing, is sufficiently small in comparison with the particle size of $Mg_2Si$ in a range of 8 to 15 μm in a brazing filler metal cladded over brazing sheets which have been generally used in the past. Accordingly, it is possible to efficiently diffuse Mg and break the oxide film during the brazing process. Consequently, although the Mg content is less than 1.2 wt. %, the present brazing sheet can exhibit a comparable gettering function to conventional ones with Mg content not less than 1.2 wt. %.

The oxide film thickness of the brazing filler material of aluminum alloy for vacuum brazing, is sufficiently small in comparison with the thickness of the oxide film in a range of 100 to 500Å on the surface of a brazing filler metal cladded over brazing sheets which have been generally used in the past. Accordingly, it is possible to break the oxide film at lower temperature during the brazing process. As a result, although the Mg content is less than 1.2 wt. %, the present brazing sheet can exhibit a comparable gettering function to conventional ones with the Mg content not less than 1.2 wt. %.

Further, the brazing sheet cladded with a brazing filler metal of aluminum alloy for vacuum brazing, saves resources without degrading quality in brazing. Additionally, the brazing sheet cladded with a brazing filler metal of aluminum alloy for vacuum brazing, can exhibit quite satisfactory advantageous effect, especially when applied to the method of aluminum vacuum brazing of the invention.

DETAILED DESCRIPTION OF THE PREFERRED EMBODIMENT

Hereinafter, an embodiment of the present invention will be described.

Figure 3:
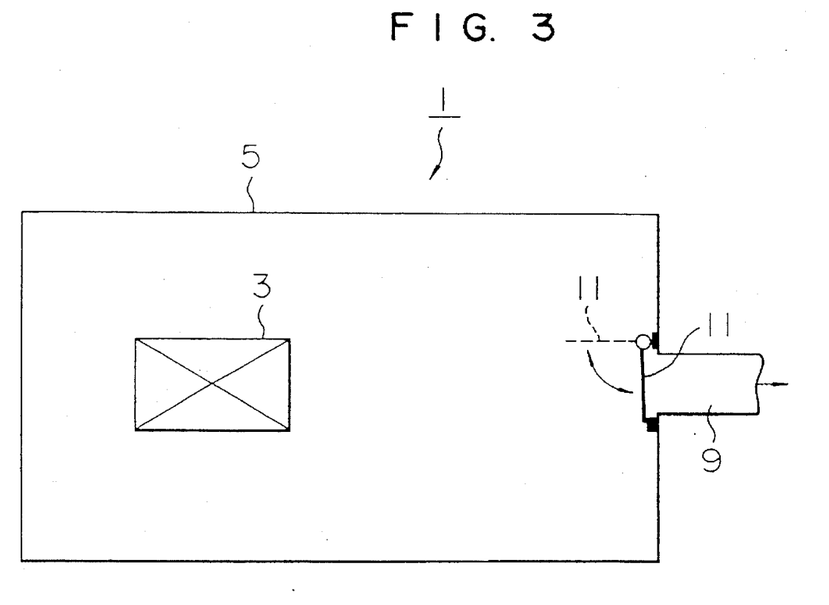
FIG. 3 is a schematic view showing the construction of a vacuum brazing furnace according to one embodiment.
Figure 4:
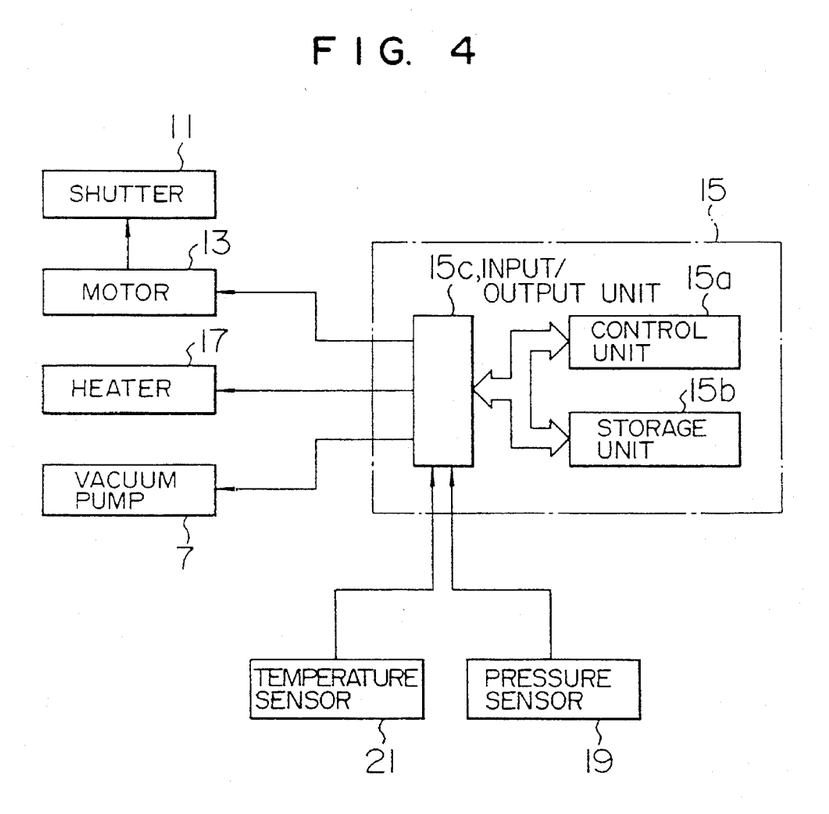
FIG. 4 is a block diagram showing the arrangement of a control system for the vacuum brazing furnace according to one embodiment.

FIGS. 3 and 4 show a vacuum brazing furnace 1 adopted as one embodiment.

The vacuum brazing furnace 1 has the structure entirely held at a high temperature during the brazing process, and comprises a furnace body 5 into which a workpiece 3 is carried, a vacuum pump 7 communicated to the furnace body 5, and a shutter 11 disposed between the furnace body 5 and the vacuum pump 7 for opening and closing an evacuation port 9.

The shutter 11 is driven by a motor 13 to open and close. The motor 13 is actuated in response to a drive command from a controller 15. The controller 15 comprises a control unit 15a, a storage unit 15b and an input and output unit 15c. The controller 15 is connected to the motor 13, the vacuum pump 7, and a heater or heaters 17 disposed in the furnace body 5 via the input and output unit 15c.

In the furnace body, there are disposed a pressure sensor 19 and a temperature sensor-(or sensors) 21. These sensor 19, 21 are also linked to the input and output unit 15c of the controller 15 so that the furnace pressure and the furnace or the workpiece temperature may be monitored, respectively.

The control unit 15a of the controller 15 outputs control signals from the input and output unit 15c to the vacuum pump 7, the heater (or heaters) 17 and the motor 13 in accordance with a control program stored in the storage unit 15b. The contents of this control program is so set as to drive the motor 13 to close the shutter 11, when the pressure in the furnace body 5 reaches a predetermined level of high vacuum at which the amount of water ($H_2O$) vapor in the furnace becomes sufficiently small and also the temperature in the furnace body 5 or the temperature of workpiece or bath reaches a predetermined value not lower than 500° C., thereby limiting evacuation from a predetermined area in the vicinity of the workpiece 3 within the furnace body 5. The control program is executed to implement the necessary steps in order over time.

Herein, this embodiment is arranged to detect arrival to the predetermined pressure and arrival to the predetermined temperature by preparing a time chart previously in consideration or experiment of evacuation conductance and heat conductive characteristics of the furnace body 5, heat conductive characteristics of the workpiece 3, etc., by estimating a measuring the pressure for evenly lapse time after starting to drive the vacuum pump 7, and by estimating or measuring the temperature for evenly lapsed time after starting to drive the heater 17.

The temperature set at a condition to close the shutter 11 corresponds to the solidus line temperature of a brazing filler metal cladded over a brazing sheet in the workpiece 3 and, therefore, is determined and programmed depending on the Mg content of the brazing filler metal on the basis of the phase diagram as shown in FIG. 1.

One example of the program will now be explained with reference to FIG. 5.

Figure 5:
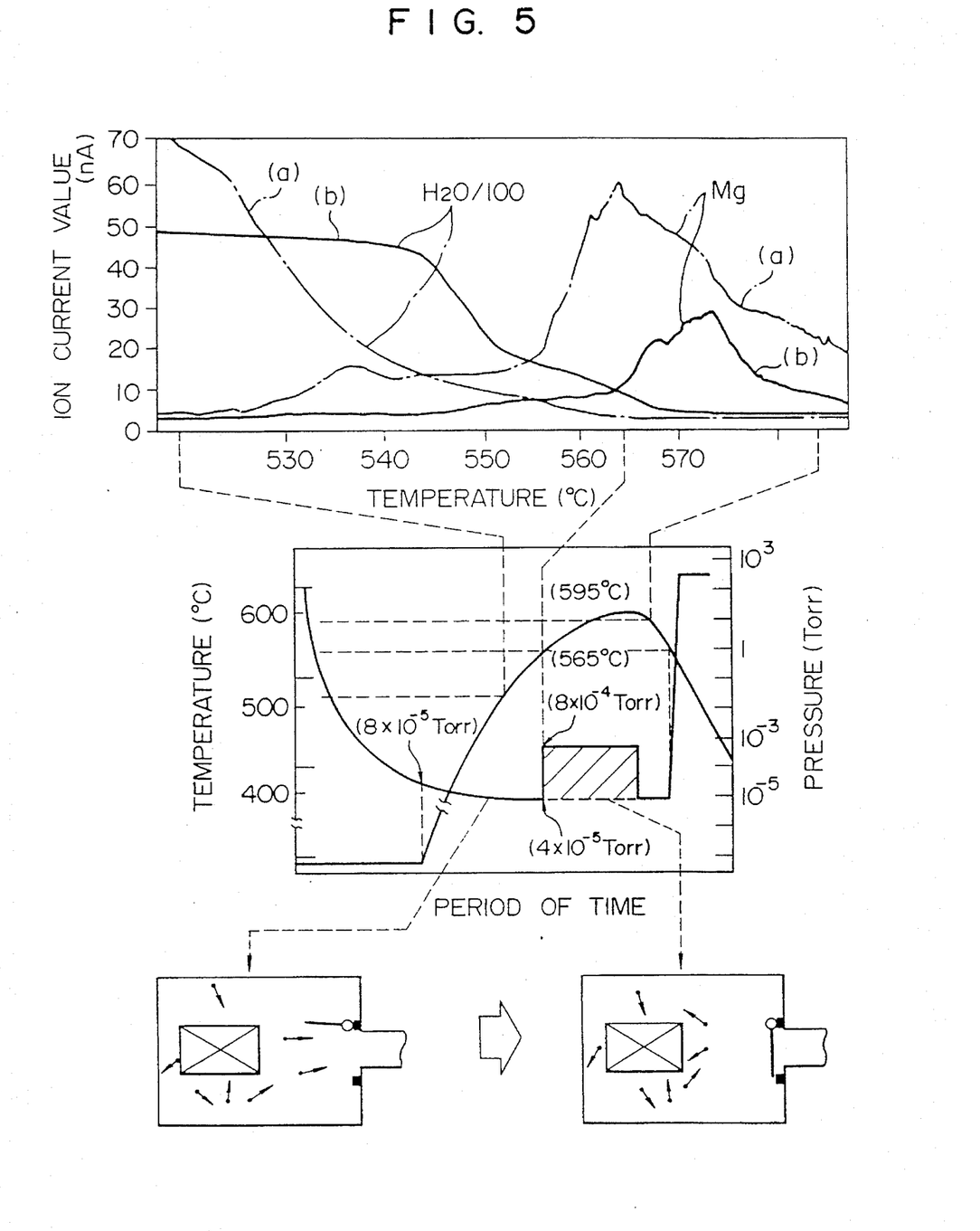
FIG. 5 is an explanatory view showing time-dependent changes in pressure in the furnace and temperature of the workpiece, results of mass spectroscopy during the vacuum brazing together with one example of control program.

FIG. 5 shows the results of mass spectroscopy (indicated by solid lines (b)) of Mg vapor and $H_2O$ as obtained when a sheet cladded with a brazing filler metal of Al-10 wt. % Si alloy containing Mg of 0.6 wt. % was subjected to vacuum heating, and a program for the furnace pressure and the workpiece temperature as executed when brazing was performed by the use of the same cladded sheet.

Under this program, the furnace is controlled in accordance with the procedure as follows. First, the vacuum pump 7 is driven to start evacuation from the interior of the furnace. At the time when the furnace pressure reaches $8 \times 10^{-5}$ Torr, the heater 17 is driven to start elevating the workpiece temperature. Then, at the time when the workpiece temperature reaches 565° C. that corresponds to the solidus line temperature for the brazing filler material of Al-10% Si alloy containing Mg of 0.6 wt. %, the motor 13 is driven to close the shutter 11.

For the purpose of comparison, FIG. 5 shows results of mass spectroscopy (indicated by one-dot-chain lines (a)) of Mg vapor and $H_2O$ as obtained when a sheet cladded with a brazing filler metal of Al-10% Si alloy containing Mg of 1.2 wt. % was subjected to vacuum heating.

Figure 7:
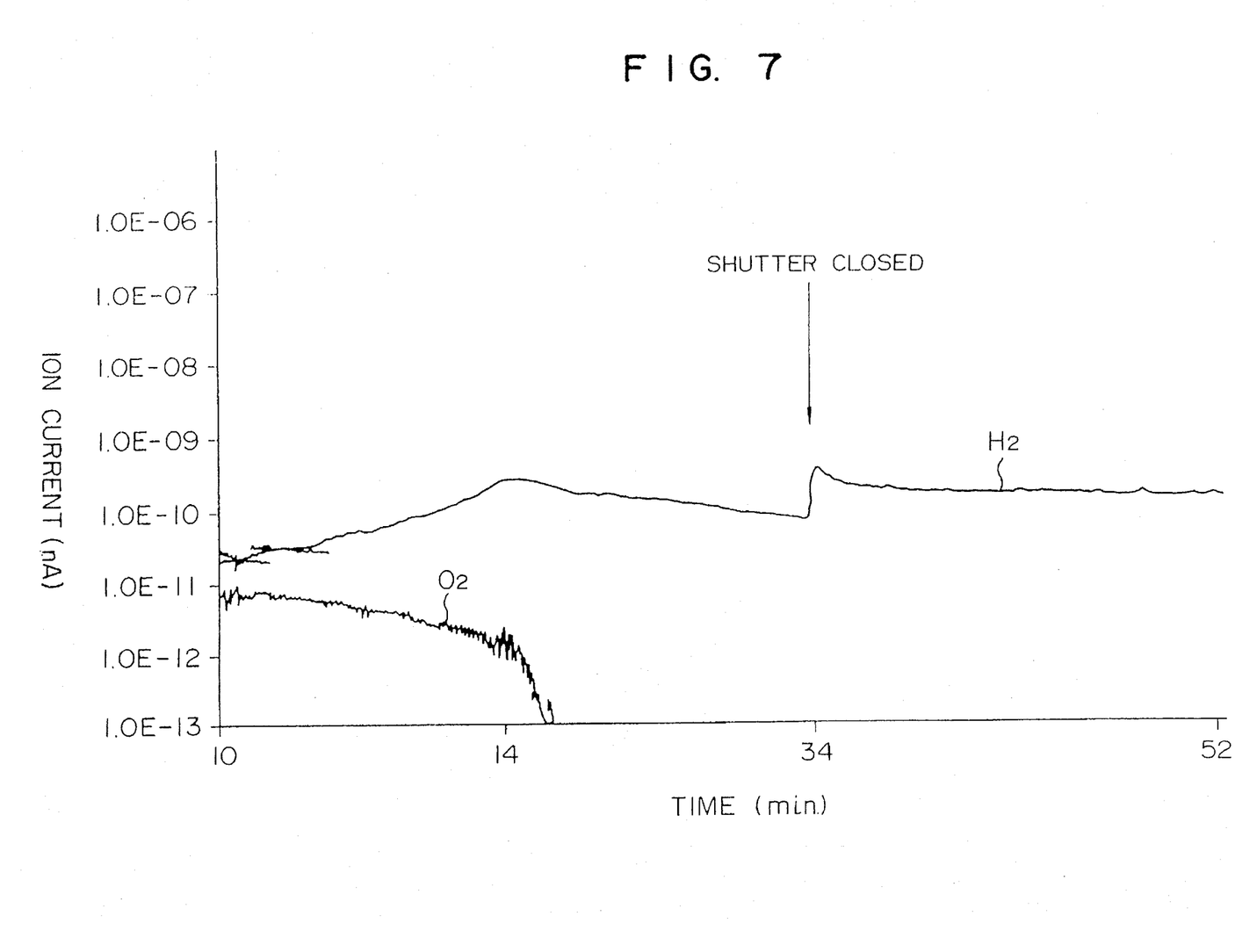
FIG. 7 is a graph showing results of mass spectroscopy for an atmosphere in the furnace in accordance with the heating and evaporating pattern of FIG. 6.

From the results of mass spectroscopy in the case of using the brazing filler metal added with Mg of 0.5 wt. %, it is found that at the time reaching 565° C. corresponding to the solidus line temperature for the brazing filler metal, the amount of Mg vapor is abruptly increased and the amount of $H_2O$ is sufficiently decreased. Accordingly, Mg vapour fills the brazing furnace by closing the shutter and limiting evacuation from the brazing furnace at that timing, i.e., when the workpiece temperature is elevated to the solidus line temperature of the brazing filler metal. FIG. 7 shows results of mass spectroscopy of the furnace atmosphere with the limitation of the evacuation. It is found that the amount of $H_2$ is abruptly increased upon closing shutter. This implies that the amount of Mg vapour in the furnace atmosphere is rapidly increased, whereupon the amount of $H_2O$ is rapidly decreased by means of the gettering function of Mg.

Figure 6:
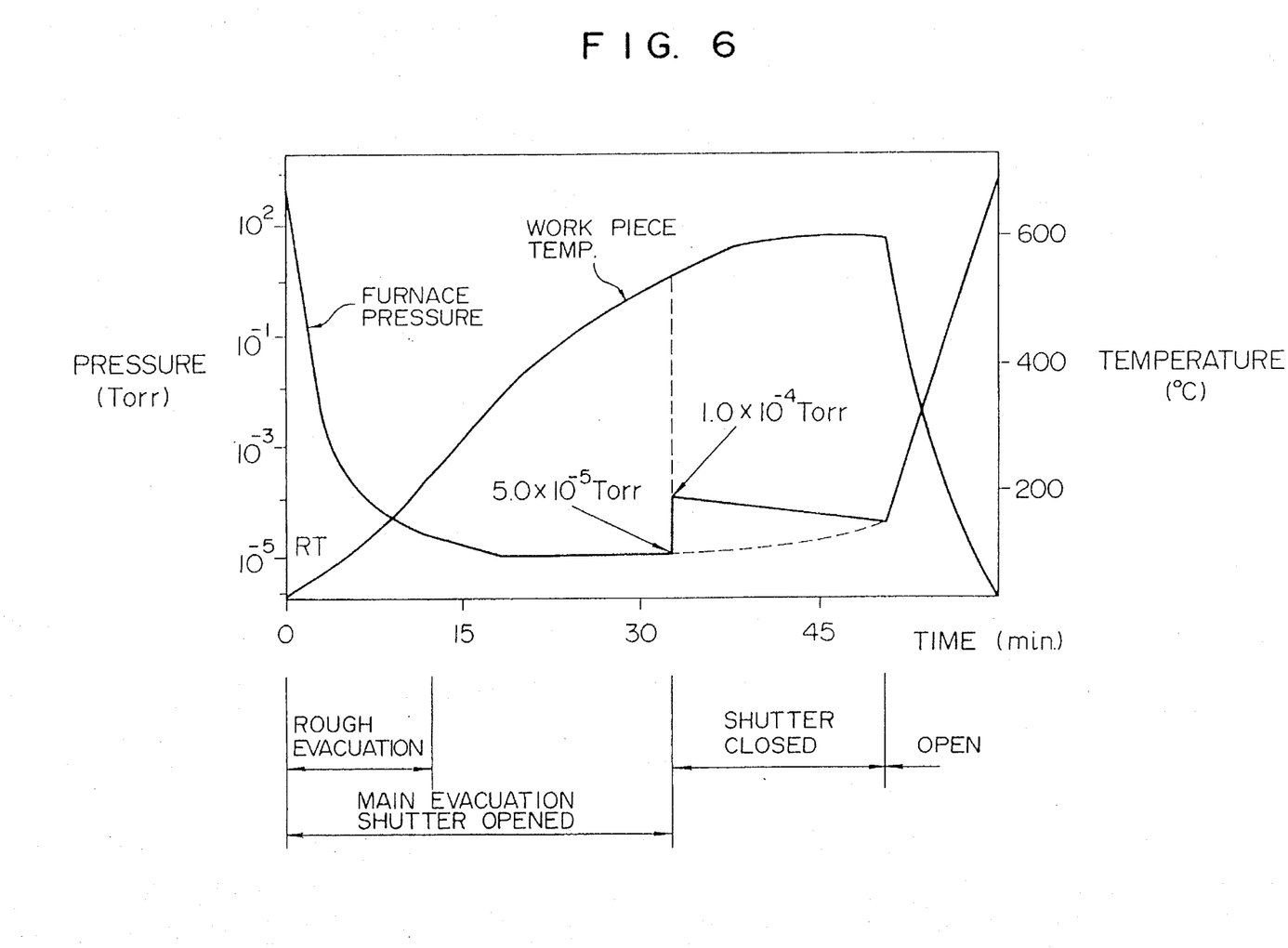
FIG. 6 is a graph showing the pressure in the furnace and the temperature of a workpiece as obtained when vacuum brazing is performed in accordance with another example of control program.

Next, to confirm effectiveness of the present invention, vacuum brazing was performed under various evacuating and heating conditions as shown in FIG. 6 by using brazing sheets cladded with various types of brazing filler metals in some of which the Mg content was adjusted to be less than 1.0 wt. %, the particle size of $Mg_2Si$ in the brazing filler metal was fined, and the oxide film on the metal fillet weld-lengths of the respective workpieces was measured, heating condition was fixed to the pattern of FIG. 6, and the shutter was closed when the workpiece temperature was elevated to the solidus lines temperature of the corresponding brazing filler metal cladded over the brazing sheets.

The brazing filler metal of Al-10 wt. % Si alloy cladded over the brazing sheets used will be first explained. Table 1 shows the Mg content, the particle size of $Mg_2Si$, and the thickness of the oxide film for each brazing filler metal.

TABLE 1

| Brazing filler metal | Mg content (wt. %) | Particle size of $Mg_2Si$ (typical value; μm) | Thickness of oxide film (Å) |
|---|---|---|---|
| A | 1.2 | 8–15 | 100–500 |
| B | " | " | 80 |
| C | 0.8 | " | 100–500 |
| D | 0.8 | " | 80 |
| E | 0.8 | 5 | 100–500 |
| F | " | " | 80 |
| G | 0.6 | 5 | 100–500 |
| H | " | " | 80 |
| I | 0.4 | 5 | 80 |
| J | 0.3 | 5 | 80 |

As for fining the particle size of $Mg_2Si$, the soaking process was carefully arranged to homogenize the brazing tiller metal and produce only small size $Mg_2Si$ particles. Herein, the soaking temperature was lowered and the soaking time was shortened to suppress nucleation and growth of $Mg_2Si$ particles in comparison with the usual soaking condition.

Thinning the oxide film was performed in the degreasing process of the brazing sheet using the diluted NaOH solution before final annealing, and thus etching the surface of the brazing filler metal. At this time, care was paid in, not to expose Si, as a precipitate in the brazing filler metal, onto the surface of the brazing filler metal. In other words, the etching treatment by the degreasing must not become too strong on etching.

The evacuating and heating conditions shown in FIG. 6 will now be explained.

The evacuation was performed in three stages; "rough evacuation" for over 10 minutes at the beginning, subsequent "main evacuation" until the total lapse of over 30 minutes with the shutter 11 opened, in which the furnace pressure was lowered down to $5 \times 10^{-5}$ Torr, and another "main evacuation" until the total lapse of about 50 minutes with the shutter 11 closed. Then, the evacuation was stopped, followed by opening the furnace.

During the above evacuating process, the heating was, started simultaneously with the evacuation, and continued so as to reach the solidus line temperature corresponding to each brazing filler metal at the time of closing the shutter 11. When the evacuation was stopped, the heating was also stopped.

Figure 8:
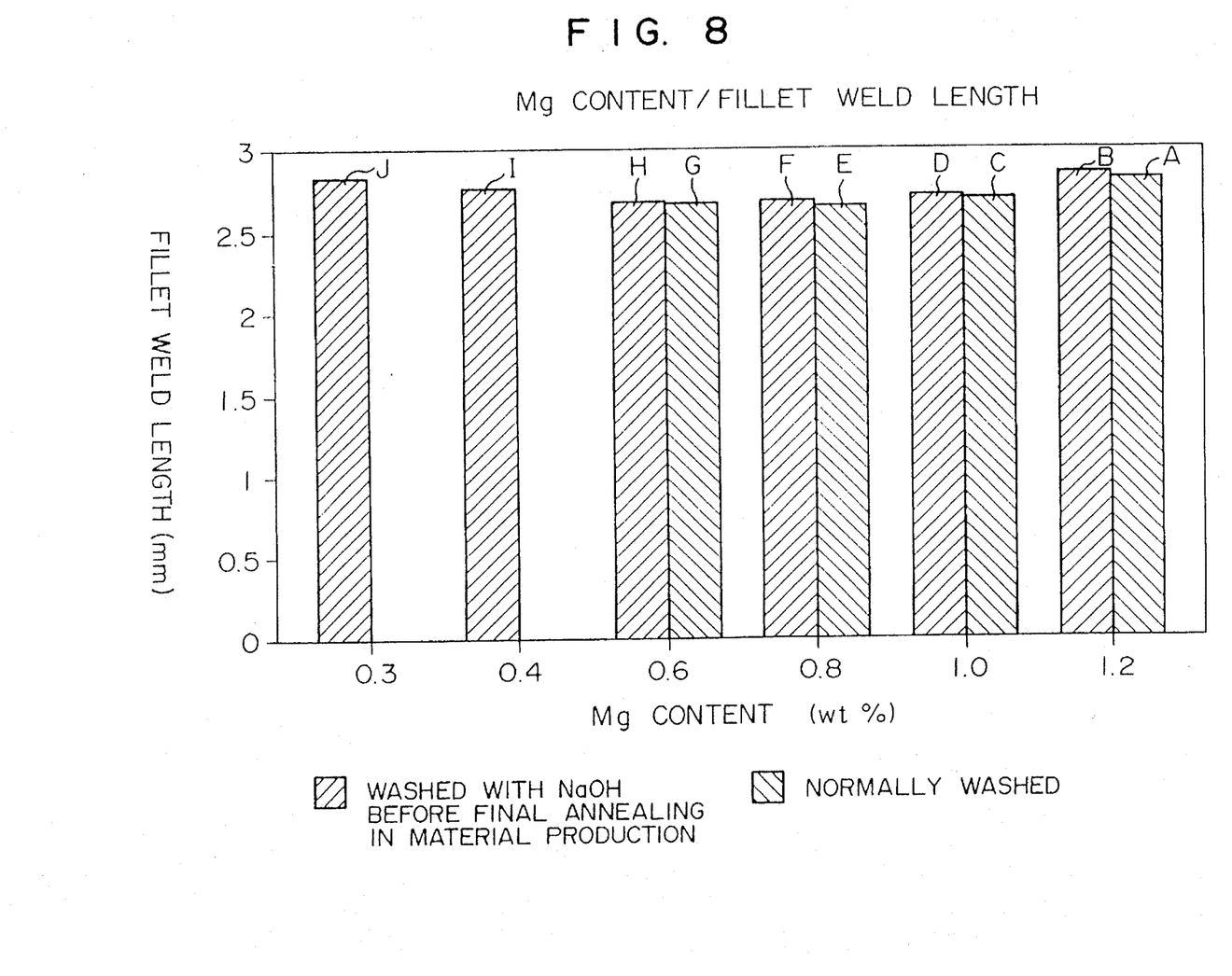
FIG. 8 is a bar graph showing results of measured fillet weld-lengths when brazing was performed for various Mg contents brazing filler metals in accordance with the program of FIG. 6.

FIG. 8 shows results of brazing of the brazing sheets cladded with the brazing filler metal C to J under the above evacuating and heating condition, and the measurement of the fillet weld lengths. Incidentally, there are shown the results for the brazing filler metals A and B under the condition without closing the shutter 11 during the evacuation in FIG. 8.

For any of the brazing filler metals C to H, the brazing resulted in the satisfactory fillet weld length of 2.5 mm or above in spite of the Mg content being less than 1.0 wt. %.

As seen from these results, the satisfactory brazing can be achieved even using the brazing filler metals of lower Mg content, by the evacuation control of this embodiment in which the shutter 11 is closed at the time when the workpiece temperature reaches at the vicinity of the solidus line temperature after arrival to a high-vacuum level.

Further, as will be seen from the comparison between the brazing filler metals C and E (or D and F), the metal subjected to the process of fining the particle size of $Mg_2Si$ exhibits the greater fillet weld-length than the metal not subjected to that fining process. Additionally, as seen from comparison between the brazing filler metals C and D, the metal subjected to the process of thinning the oxide film exhibits the greater fillet weld-length than the material not subjected to that thinning process.

From those results, it is found that by performing the process of fining the particle size of $Mg_2Si$ or the process of thinning the oxide film, besides the evacuation control, the satisfactory brazing can be achieved even with the lower Mg content. It is also found that implementing both processes is more desirable.

In fact, as a result of implementing both the process of fining the particle size of $Mg_2Si$ and the process of thinning the oxide film, in addition to the evacuation control, for the brazing sheets cladded with the brazing filler metals containing Mg of 0.3 wt. % and 0.4 wt. %, it was confirmed that the fillet weld-length was excess of 2.5 mm and the brazing quality was satisfactory.

Studying A, F, G, I, J among the metals shown in Table 1, the results such as hydrostatic pressure strength in the brazed portions were satisfactory as shown in Table 2. It was herein assumed that for the cases of performing the evacuation control ("Yes"), the value of the furnace pressure for closing the shutter was set to $5 \times 10^{-5}$ Tort and the condition of the furnace temperature was set to the solidus line temperature for each of the brazing filler metals.

TABLE 2

| | Brazing filler metal | | | | |
|---|---|---|---|---|---|
| | A | F | G | I | J |
| Mg content (wt. %) | 1.2 | 0.8 | 0.6 | 0.4 | 0.3 |
| Particle size of $Mg_2Si$ (typical value; μm) | 8–15 | 6 | 5 | 5 | 5 |
| Thickness of oxide film (Å) | 100–500 | 80 | 100–500 | 80 | 80 |
| Evacuation control | No | Yes | Yes | Yes | Yes |
| Fillet weld length (mm) | 2.84 | 2.71 | 2.68 | 2.77 | 2.84 |
| Hydrostatic pressure strength (kgf/mm$^2$) | 56 | 56 | 55 | 54 | 53 |

Thus, by performing the evacuation control with the particle size of $Mg_2Si$ set to 2 μm as a typical value and the thickness of the oxide film set to 80 Å, the satisfactory hydrostatic pressure strength was obtained even in the case of the Mg content being 0.3 wt. % (corresponding to the brazing filler metal J).

Next, there will be explained results from which it was confirmed by another experiment that the evacuation control, the process of fining the particle size of $Mg_2Si$, and the process of thinning the oxide film are effective for brazing filler metals containing Mg of 1.2 wt. % of less.

Figure 9:
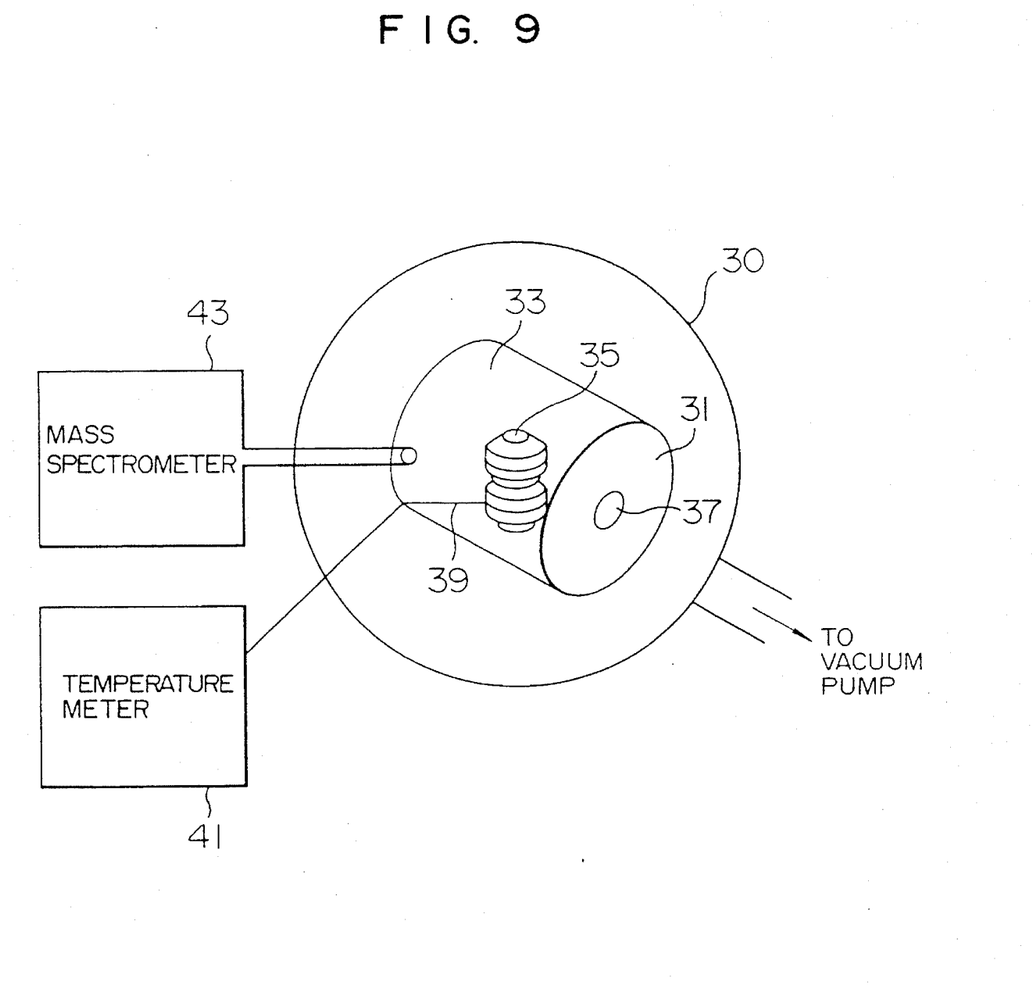
FIG. 9 is a schematic view showing the construction of a vacuum heating furnace model experimentally assembled.

In this experiment, as shown in FIG. 9, a beaker 33 fitted with a lid 31 was disposed in an experimental vacuum brazing furnace 30, thus regarding the beaker 33 as a brazing furnace. A brazing model 35 regarded as a workpiece was placed in the beaker 33. The brazing model 35 was fabricated by pressing brazing sheets cladded with various brazing filler metals. In the experiment, use was made of the breaker 33 with the volume of 1.2 liters. The beaker 33 had the outer diameter of 116 mm. The lid 31 were prepared in two types; (A) having a hole 37 of 20 mm in diameter and (B) having hole of 115 mm in diameter (essentially corresponding to no lid case). In the experiment, the interiors of both the furnace 30 and the beaker 33 were sufficiently evacuated until reaching $5 \times 10^{-5}$ Torr, and then followed by starting heating. Accordingly, the experiment was conducted to compare two evacuation conditions by adopting (1) "evacuation non-control condition" in which the interiors were evacuated through the evacuation hole (B) of 115 mm in diameter corresponding to the open-shutter evacuation control, i.e., the condition of no evacuation control, and (2) "evacuation control condition" in which the interiors were evacuated through the evacuation hole (A) of 20 mm in diameter, corresponding to the shutter-fluttering evacuation control, i.e., the condition of the evacuation control. Additionally, a thermocouple 39 was attached to monitor the brazing model 35 with a temperature metal 41, and mass spectroscopy of the atmosphere in the breaker 33 was analyzed by a mass spectrometer 43.

Brazing sheets cladded with two types of brazing filler metals of Al-10% Si alloy containing Mg of 0.8 wt. % (K and L), as shown in Table 3, were prepared. The experiment was then conducted under the above "evacuation non-control condition" for the brazing sheet cladded with the brazing filler metal K, and under the above "evacuation control condition" for the brazing sheet cladded with the brazing filler metal No. L, thereby comparing the amounts of Mg in the furnace by mass spectroscopy. The obtained results are shown in FIG. 10.

TABLE 3

| Brazing filler material | Mg content (wt. %) | Particle size of $Mg_2Si$ (typical value; μm) | Thickness of oxide film (Å) |
|---|---|---|---|
| K | 0.8 | 40 | 43 |
| L | " | 2 | 26 |

Figure 10:
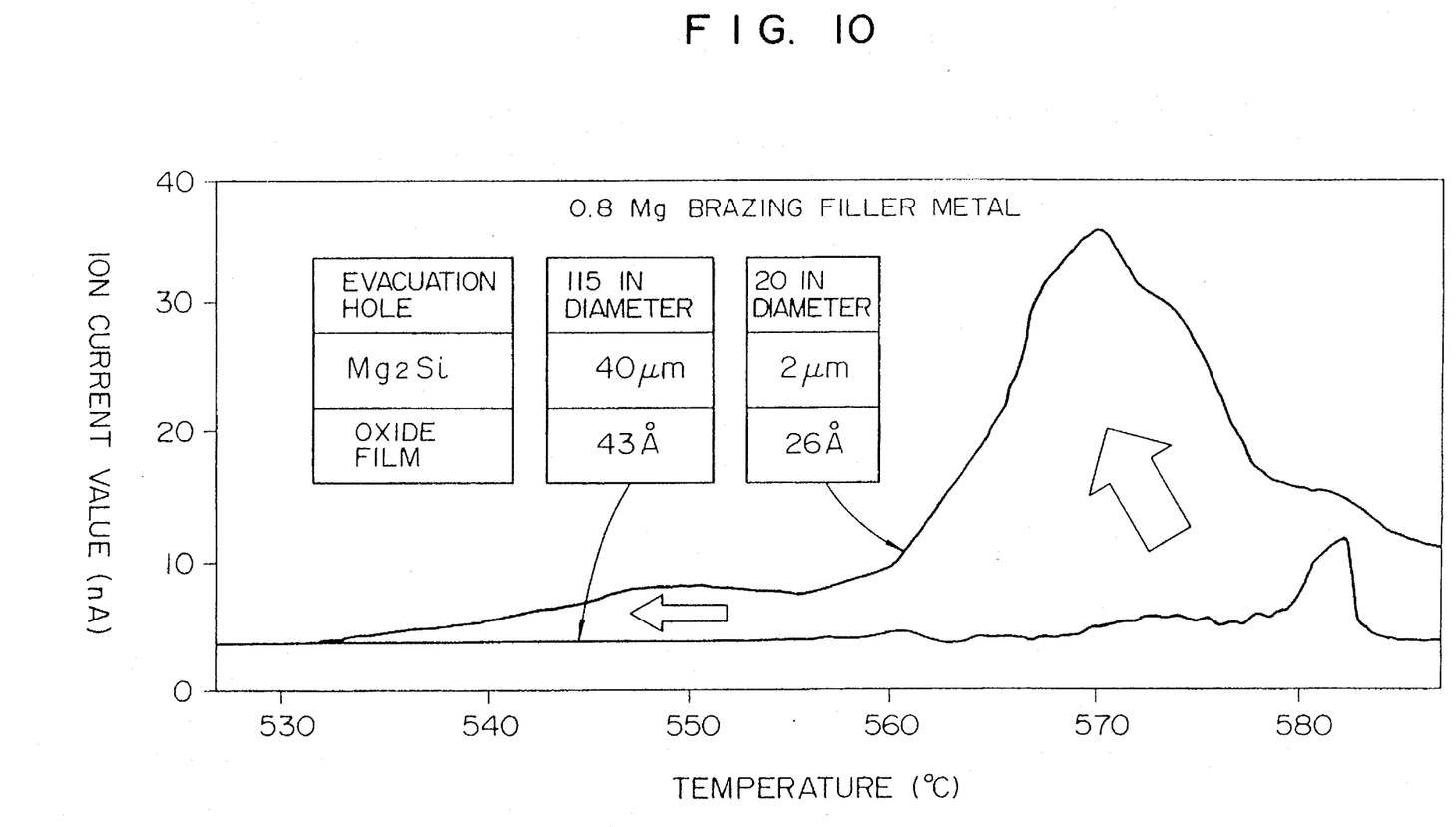
FIG. 10 is a graph showing results of measured mass spectroscopy of Mg during the temperature elevating period after reaching a high vacuum level in the experimental furnace of FIG. 9, while changing the size of an evacuation hole, i.e., changing the evacuating conductivity.
Figure 11:
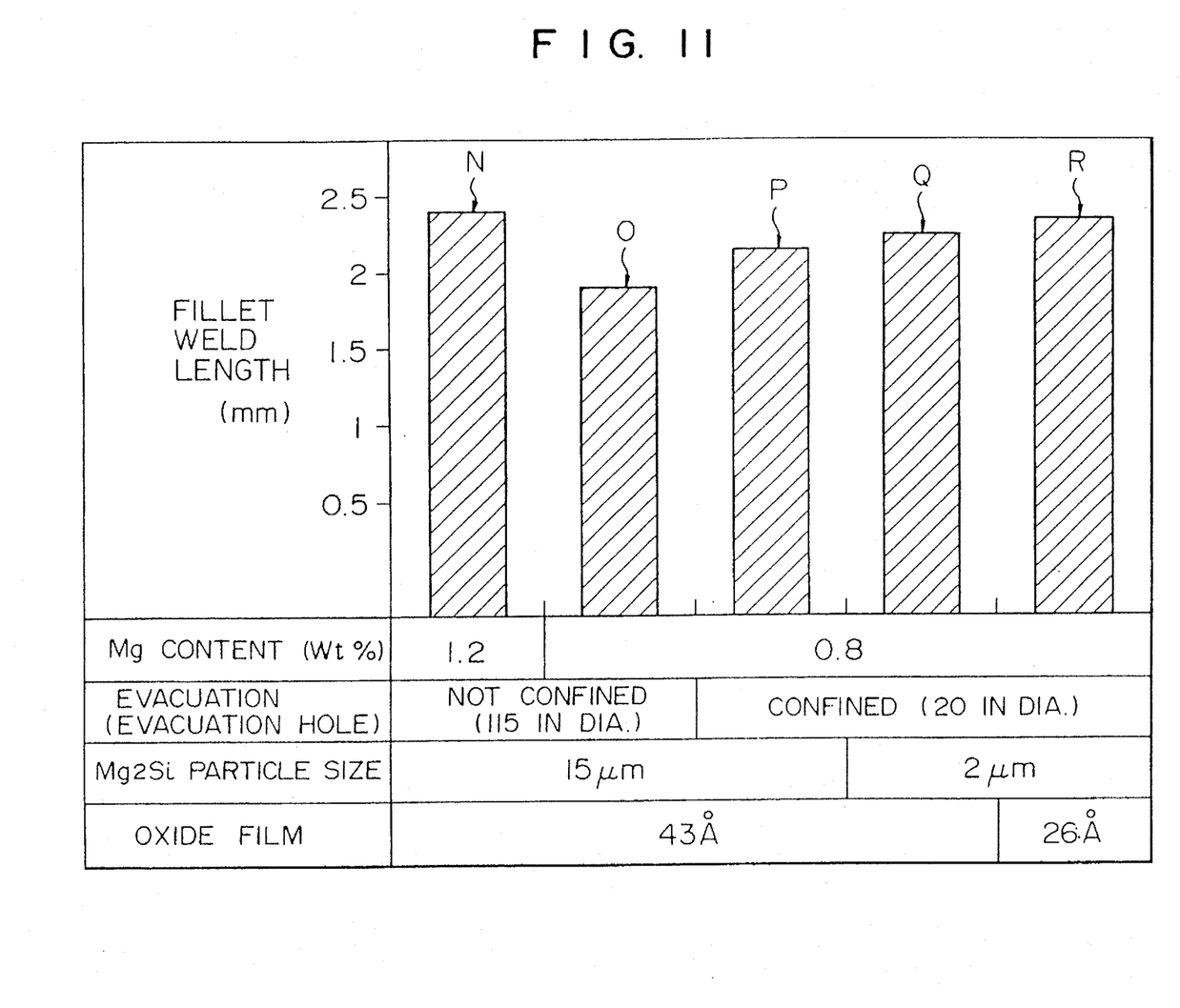
FIG. 11 is a bar graph showing results of measured fillet weld-lengths, along with various brazing filler metal and various brazing metal conditions, when brazing is performed for various Mg contents of brazing filler metal in the experimental furnace of FIG. 9.

It is found from FIG. 10 that depending on the presence of the "evacuation control" makes a large difference in the amount of Mg vapor within the beaker nearly from the point exceeding the solidus line temperature. Besides the evacuation conditions, the brazing filler metals K and L are also largely different from each other in the particle size of $Mg_2Si$ and so forth. Therefore, as shown in FIG. 11, brazing sheets cladded with brazing filler metals N to R were further prepared and brazing tests were conducted for those brazing sheets to compare the fillet weld lengths. The Mg content, the particle size of $Mg_2Si$, the thickness of the oxide film and the evacuation condition for the respective brazing filler metals cladded over the brazing sheets are indicated in FIG. 11. Additionally, in the process of thinning the oxide film, etching was made twice to provide the extremely thinner oxide film than usual levels (100 to 500Å).

First, from the comparison between the brazing filler metals N and O, the conventional problem can be easily understood: the brazing quality is not satisfactory for the brazing filler metal containing Mg less than 1.2 wt. % under the "evacuation non-control condition".

Second, from the comparison between the brazing filler materials O and P, it can be understood that satisfactory brazing quality can be achieved even for the brazing filler metal containing Mg of 0.8 wt. % (or less) by adding the "evacuation control condition".

Third, from the comparison between the brazing filler metals P and Q, it can be understood that brazing quality can be further improved by fining the particle size of $Mg_2Si$ in addition to the "evacuation control condition".

Fourth, from the comparison between the brazing filler metal Nos. Q and R, it can be understood that the thinning the oxide film improves the brazing quality furthermore.

From the above-stated results, it is found that by controlling the evacuation to bring the interior of the furnace into a state, in which gas flow is limited (at least within a predetermined area surrounding the workpiece), after reaching a high-vacuum level, the brazing can be performed with satisfactory quality even for the brazing sheet cladded with the brazing filler metal of aluminum containing Mg less than 1.2 wt. %.

It is also found that by performing the process of fining the particle size of $Mg_2Si$ and/or the process of thinning the oxide film on the surface of the brazing filler metal in addition to the above evacuation control, brazing quality can be further improved for the brazing sheet cladded with the brazing filler metal of aluminum containing the same amount of Mg.

In the above stated beaker experiments using the brazing sheets cladded with the brazing filler metals Nos. K to R, the vacuum brazing was performed using the furnace that the evacuation therefrom is limited from the beginning, and starting heating after the furnace pressure has reached a predetermined high-vacuum level. These beaker experiments well simulates the vacuum brazing technique claimed in this invention, however, that processing technique is not suitable for industriallization because it is time-consuming and leads to a long cycle time of brazing even if using a huge vacuum pump.

On the contrary, by using the furnace construction as shown in FIGS. 3 and 4 and adopting the technique of limiting the evacuation after reaching a high-vacuum level as illustrated in FIG. 5 or 6, the present invention can be industrialized with no such problems of prolonging the time necessary for brazing.

As fully explained above, according to the method of vacuum brazing aluminum, Mg's specific functions such as breakage of an oxide film, gettering and reducing can be sufficiently achieved even if the amount of Mg contained in a brazing filler metal cladded over a brazing sheet is lowered, which results in saving of Mg. Simultaneously, the furnace can be prevented from being contaminated by dispersion of Mg.

Further, according to the furnace for aluminum vacuum brazing it is possible to practically industrialize the method of aluminum vacuum brazing, and perform brazing with high efficiency and valuable effect in saving resources.

In addition, according to the brazing sheet cladded with a brazing filler metal of aluminum for aluminum vacuum brazing it is possible to provide a novel brazing sheet which is effective in saving resources and suitable for practicing the methods of the present invention as defined in.

Although the embodiment of the present invention has been described hereinabove, it should be appreciated that the present invention is not limited to the illustrated embodiment and can be variously modified in a scope without departing from the principles of the invention, for example, in a point of further fining the particle size of $Mg_2Si$.

What is claimed is:

1. A brazing sheet for vacuum brazing, wherein said sheet is clad with an aluminum alloy brazing filler having a content of Mg sufficient for vacuum brazing but less than 1.2 wt. % and wherein the $Mg_2Si$ particle size among Mg contained in said filler is not more than 5 μm as a typical value.

2. A brazing sheet for vacuum brazing, wherein said sheet is clad with an aluminum alloy brazing filler metal having a content of Mg sufficient for vacuum brazing but less than 1.2 wt. % and the $Mg_2Si$ particle size among Mg contained in said metal is not more than 5 μm as a typical value and an oxide film thickness on a surface of said metal is less than 100 angstroms.

* * * * *